W. H. HOLDAM.
Churns.

No. 138,089. Patented April 22, 1873.

Witnesses:
Inventor:
W. H. Holdam
PER
Attorneys.

UNITED STATES PATENT OFFICE.

WILLIAM H. HOLDAM, OF CRAB ORCHARD, KENTUCKY.

IMPROVEMENT IN CHURNS.

Specification forming part of Letters Patent No. 138,089, dated April 22, 1873; application filed March 1, 1873.

*To all whom it may concern:*

Figure 1:
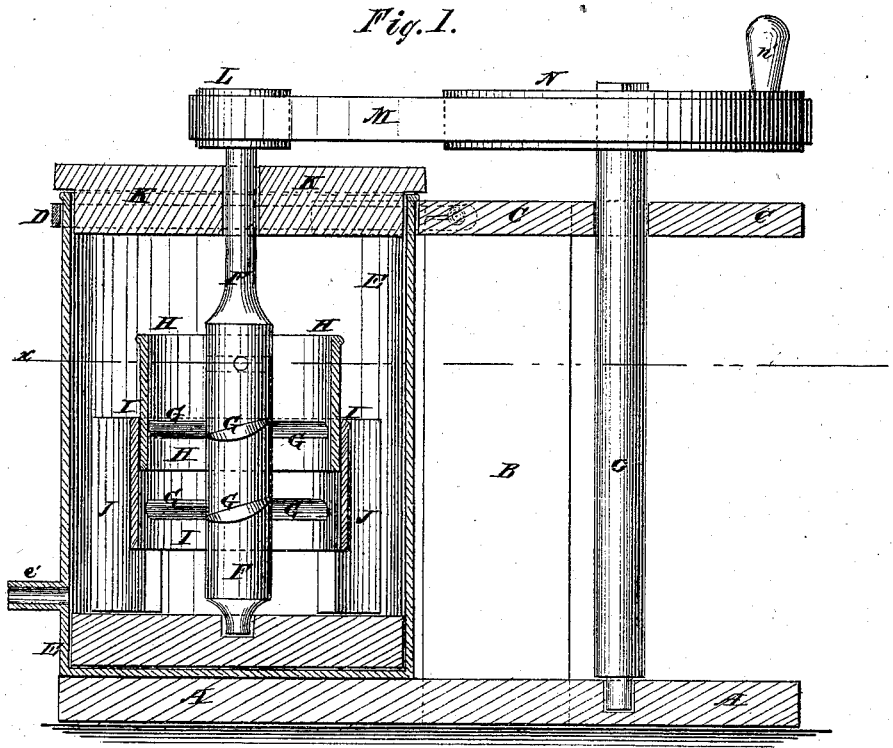
Figure 2:
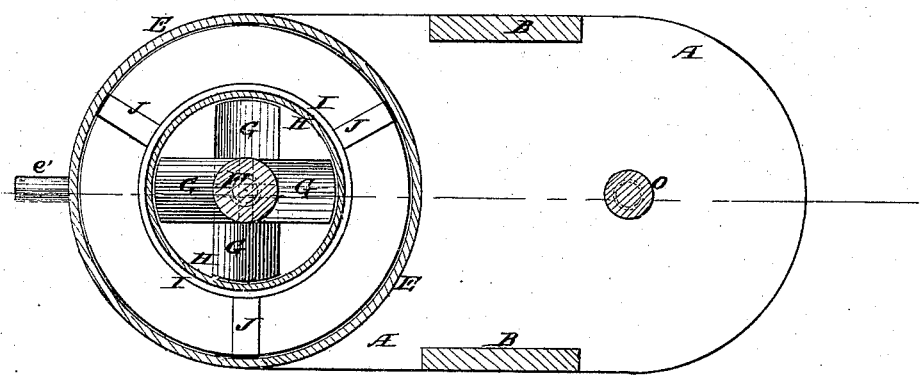

Be it known that I, WILLIAM H. HOLDAM, of Crab Orchard, in the county of Lincoln and State of Kentucky, have invented a new and useful Improvement in Churn, of which the following is a specification:

Figure 1 is a detail vertical section of my improved churn taken through the line $x\ x$, Fig. 2. Fig. 2 is a detail horizontal section of the same taken through the line $y\ y$, Fig. 1.

Similar letters of reference indicate corresponding parts.

The invention consists in the improvement of churns, as hereinafter fully described and pointed out in the claim.

A represents the base-plate of the framework, upon one end of which the churn stands. To the opposite sides of the rear parts of the side edges of the base-plate A are attached the lower end of the standards B, to and between the upper edges of which is attached the top plate C, the forward end of which is concaved to receive and fit upon the side of the upper part of the churn-body A, and is provided with a detachable strap, D, to be passed around the said churn-body to hold it securely in place. E is the churn-body, which is made cylindrical in form, and to the bottom of which, or to a false bottom placed upon said bottom, is pivoted the lower end of the dasher-shaft F. To the sides of the dasher-shaft F are attached a number of radial arms or blades, G, which are made wide and are inclined laterally. H is a curb or short tube, of such a size as to surround the dasher F G, and allow said dasher to revolve freely within it. The tube or curb H fits into a similar tube or curb, I, which has radial flanges or blocks J formed upon or attached to it, the outer edges of which rest against the inner surface of the churn-body E, so as to keep the curbs H I securely in place and accurately centered. The lower ends of the blocks J project below the lower end of the curb I, as shown in Fig. 1, to support the lower end of the curb I at such a distance above the bottom of the churn-body as will allow the milk to have a free passage beneath the lower edge of the said curb.

In using the churn the curb H is adjusted in the curb I so that the upper edge of the said curb H may be a little above the surface of the milk to be churned. Then, as the dasher F G is revolved, the blades G raise the milk through the curb and project it outward over the edge of the curb H against the sides of the churn-body E, its place being immediately supplied by milk flowing in beneath the lower edge of the curb I, thus producing a continuous circulation and a violent agitation of the milk, bringing the butter in a very short time. The flanges or blocks J prevent the milk in the space between the curbs H I and the churn-body from receiving a circular motion from the dasher F G, which circular motion would impede the inflow of the milk beneath the lower edge of the curb I.

K is the cover, which is made in two parts, having half-round notches formed in their adjacent edges, which, when the cover is in place, form the upper bearing for the dasher-shaft F. To the upper end of the dasher-shaft F is attached a pulley, L, around which passes a belt, M, which also passes around a large pulley, N, attached to the upper end of the shaft O, which works in bearings in the plates A C of the frame-work A B C. To the pulley N is attached a handle, $n'$, to adapt said pulley to serve as a crank-wheel for operating the dasher. The churn-body E is provided with a spout or faucet, $e'$, for drawing off the contents of said churn-body when desired.

Having thus described my invention, I claim as new and desire to secure by Letters Patent—

The dasher F G, adjustable curbs H I, and radial flanges or block J, in combination with each other and with the churn-body E, substantially as herein shown and described, and for the purpose set forth.

WILLIAM HARDEN HOLDAM.

Witnesses:
    J. D. PETTUS,
    GEO. S. JONES.